United States Patent
Lindholm et al.

(10) Patent No.: US 6,870,540 B1
(45) Date of Patent: Mar. 22, 2005

(54) SYSTEM, METHOD AND COMPUTER PROGRAM PRODUCT FOR A PROGRAMMABLE PIXEL PROCESSING MODEL WITH INSTRUCTION SET

(75) Inventors: John Erik Lindholm, Cupertino, CA (US); Henry P. Moreton, Woodside, CA (US); Harold Robert Feldman Zatz, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 389 days.

(21) Appl. No.: 09/885,382

(22) Filed: Jun. 19, 2001

Related U.S. Application Data

(63) Continuation-in-part of application No. 09/586,249, filed on May 31, 2000, and a continuation-in-part of application No. 09/454,516, filed on Dec. 6, 1999, now Pat. No. 6,198,488.

(51) Int. Cl.[7] .............................. G06T 1/00; G06T 1/20
(52) U.S. Cl. ....................... 345/522; 345/506; 345/582; 345/591
(58) Field of Search .................................. 345/501–506, 345/519–520, 522, 530–574, 582, 586, 418, 419, 421, 422, 428, 589–592, 611, 614, 616

(56) References Cited

U.S. PATENT DOCUMENTS

| | | | | |
|---|---|---|---|---|
| 4,985,848 A | | 1/1991 | Pfeiffer et al. | 364/518 |
| 4,996,666 A | * | 2/1991 | Duluk, Jr. | 365/49 |
| 5,020,115 A | | 5/1991 | Black | 382/44 |
| 5,535,288 A | * | 7/1996 | Chen et al. | 382/236 |
| 5,572,634 A | * | 11/1996 | Duluk, Jr. | 395/119 |
| 5,574,835 A | * | 11/1996 | Duluk, Jr. et al. | 395/121 |
| 5,596,686 A | * | 1/1997 | Duluk, Jr. | 395/122 |
| 5,669,010 A | * | 9/1997 | Duluk, Jr. | 395/800.22 |
| 5,694,143 A | | 12/1997 | Fielder et al. | 345/112 |
| 5,764,228 A | * | 6/1998 | Baldwin | 345/344 |
| 5,798,762 A | | 8/1998 | Sfarti et al. | 345/420 |

(List continued on next page.)

FOREIGN PATENT DOCUMENTS

| | | | | |
|---|---|---|---|---|
| EP | 0 690 430 A2 | | 1/1996 | G09G/1/16 |
| WO | 93/23816 | * | 11/1993 | G06F/15/334 |
| WO | 97/05575 | * | 2/1997 | G06T/15/00 |
| WO | 97/05576 | * | 2/1997 | G06T/15/00 |
| WO | 98/28695 | | 7/1998 | G06F/15/16 |
| WO | 99/52040 | | 10/1999 | G06F/15/76 |

(List continued on next page.)

OTHER PUBLICATIONS

IEE Colloquium of Computer Graphics Systems, "A foxed–point RISC Graphics Engine" by D. Allerton, Jan. 15, 1992.*
ACM Siggraph 2001, "A user–programmable vertex engine" by E. Lindholm et al, pp149–158, 8/01.*
Mark Kilgard, "All About OpenGL Extensions", http://www.opengl.org/developers/code/features/OGLextensions/OGLextensions.html, downloaded Feb. 24, 2003.
"How to Create OpenGL Extensions", http://oss.sgi.com/projects/ogl–sample/registry/doc/rules.html, downloaded Feb. 24, 2003.
Olano et al, "Triangle Scan Conversion Using 2D Homogeneous Coordinates", 1997, SIGGRAPH/Eurographics Workshop.

*Primary Examiner*—Kee M. Tung
(74) *Attorney, Agent, or Firm*—Zilka-Kotab, PC

(57) ABSTRACT

A system, method and computer program product are provided for programmable pixel processing in a computer graphics pipeline. Initially, pixel data is received from a source buffer. Thereafter, programmable operations are performed on the pixel data in order to generate output. The operations are programmable in that a user may utilize instructions from a predetermined instruction set for generating the same. Such output is stored in a register.

32 Claims, 5 Drawing Sheets

| OPCODE | INPUT(scalar or vector) | OUTPUT(scalar or vector) |
|---|---|---|
| NOP | | |
| TEX, TXP | v | v |
| TXD | v, v, v | v |
| DDX, DDY | v | v |
| MOV | v | v |
| MUL | v, v | v |
| ADD | v, v | v |
| MAD | v, v, v | v |
| RCP | s | ssss |
| RSQ | s | ssss |
| DP3 | v, v | ssss |
| DP4 | v, v | ssss |
| DST | v, v | v |
| MIN, MAX | v, v | v |
| PK2, PK4 | v | s |
| UP2, UP4 | s | v |
| SLT, SGE | v, v | v |
| FRC, FLR | v | v |
| KIL | RC | |
| EXP | s | v |
| LOG | s | v |
| LIT | v | v |

U.S. PATENT DOCUMENTS

| | | | |
|---|---|---|---|
| 5,798,770 A | | 8/1998 | Baldwin ..................... 345/506 |
| 5,838,337 A | | 11/1998 | Kimura et al. .............. 345/519 |
| 5,966,532 A | | 10/1999 | McDonald et al. ......... 395/701 |
| 5,977,987 A | * | 11/1999 | Duluk, Jr. ................... 345/441 |
| 5,977,997 A | | 11/1999 | Vainsencher ................ 345/519 |
| 6,000,027 A | | 12/1999 | Pawate et al. ................ 712/39 |
| 6,046,747 A | | 4/2000 | Saunders et al. ........... 345/430 |
| 6,163,837 A | * | 12/2000 | Chan et al. ................. 712/216 |
| 6,229,553 B1 | * | 5/2001 | Duluk, Jr. et al. .......... 345/506 |
| 6,268,875 B1 | * | 7/2001 | Duluk, Jr. et al. .......... 345/506 |
| 6,285,378 B1 | * | 9/2001 | Duluk, Jr. ................... 345/441 |
| 6,288,723 B1 | * | 9/2001 | Huff et al. .................. 345/644 |
| 6,288,730 B1 | * | 9/2001 | Duluk, Jr. et al. .......... 345/552 |
| 6,417,858 B1 | * | 7/2002 | Bosch et al. ................ 345/522 |
| 6,577,316 B2 | * | 6/2003 | Brethour et al. ............ 345/505 |
| 6,714,197 B1 | * | 3/2004 | Thekkath et al. ........... 345/522 |

FOREIGN PATENT DOCUMENTS

| | | | | |
|---|---|---|---|---|
| WO | 00/10372 | * | 3/2000 | |
| WO | 00/11562 | * | 3/2000 | ........... G06F/15/00 |
| WO | 00/11602 | * | 3/2000 | |
| WO | 00/11603 | * | 3/2000 | |
| WO | 00/11604 | * | 3/2000 | |
| WO | 00/11605 | * | 3/2000 | |
| WO | 00/11607 | * | 3/2000 | ............. G06T/1/20 |
| WO | 00/11613 | * | 3/2000 | ........... G06T/15/00 |
| WO | 00/11614 | * | 3/2000 | ........... G06T/17/00 |
| WO | 00/19377 | * | 4/2000 | ........... G06T/15/00 |

* cited by examiner

| Slot | Attribute | Description |
|---|---|---|
| 0 | Position | X,Y,Z,1/W |
| 1 | Diffuse Color | R,G,B,A |
| 2 | Specular Color | R,G,B,A |
| 3 | Fog Distance | F,0.0,0.0,1.0 |
| 4 | Texture0 | S,T,R,Q |
| 5 | Texture1 | S,T,R,Q |
| 6 | Texture2 | S,T,R,Q |
| 7 | Texture3 | S,T,R,Q |
| 8 | Texture4 | S,T,R,Q |
| 9 | Texture5 | S,T,R,Q |
| 10 | Texture6 | S,T,R,Q |
| 11 | Texture7 | S,T,R,Q |

Figure 5

| OPCODE | INPUT(scalar or vector) | OUTPUT(scalar or vector) |
|---|---|---|
| NOP | | |
| TEX,TXP | v | v |
| TXD | v,v,v | v |
| DDX,DDY | v | v |
| MOV | v | v |
| MUL | v,v | v |
| ADD | v,v | v |
| MAD | v,v,v | v |
| RCP | s | ssss |
| RSQ | s | ssss |
| DP3 | v,v | ssss |
| DP4 | v,v | ssss |
| DST | v,v | v |
| MIN,MAX | v,v | v |
| PK2,PK4 | v | s |
| UP2,UP4 | s | v |
| SLT,SGE | v,v | v |
| FRC,FLR | v | v |
| KIL | RC | |
| EXP | s | v |
| LOG | s | v |
| LIT | v | v |

Figure 6

SYSTEM, METHOD AND COMPUTER PROGRAM PRODUCT FOR A PROGRAMMABLE PIXEL PROCESSING MODEL WITH INSTRUCTION SET

RELATED APPLICATIONS

The present application is a continuation-in-part of an application entitled "SYSTEM, METHOD AND ARTICLE OF MANUFACTURE FOR A PROGRAMMABLE VERTEX PROCESSING MODEL WITH INSTRUCTION SET" filed May 31, 2000 under Ser. No. 09/586,249, and an application entitled "METHOD, APPARATUS AND ARTICLE OF MANUFACTURE FOR TRANSFORMING, LIGHTING AND RASTERIZATION ON A SINGLE SEMICONDUCTOR PLATFORM" filed Dec. 6, 1999 under Ser. No. 09/454,516, now U.S. Pat. No. 6,198,488.

FIELD OF THE INVENTION

The present invention relates to computer graphics, and more particularly to providing programmability in a computer graphics processing pipeline.

BACKGROUND OF THE INVENTION

Graphics application program interfaces (API's) have been instrumental in allowing applications to be written to a standard interface and to be run on multiple platforms, i.e. operating systems. Examples of such graphics API's include Open Graphics Library (OpenGL®) and Direct 3D™ (D3D™) pipelines. OpenGL® is the computer industry's standard graphics API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Thus, in any computer system which supports this OpenGL® standard, the operating system(s) and application software programs can make calls according to the standard, without knowing exactly any specifics regarding the hardware configuration of the system. This is accomplished by providing a complete library of low-level graphics manipulation commands, which can be used to implement graphics operations.

A significant benefit is afforded by providing a predefined set of commands in graphics API's such as OpenGL®. By restricting the allowable operations, such commands can be highly optimized in the driver and hardware implementing the graphics API. On the other hand, one major drawback of this approach is that changes to the graphics API are difficult and slow to be implemented. It may take years for a new feature to be broadly adopted across multiple vendors.

With the integration of transform operations into high speed graphics chips and the higher integration levels allowed by semiconductor manufacturing, it is now possible to make part of the pipeline accessible to the application writer. There is thus a need to exploit this trend in order to afford increased flexibility in visual effects. In particular, there is a need to provide a new computer graphics programming model and instruction set that allows convenient implementation of changes to the graphics API, while preserving the driver and hardware optimization afforded by currently established graphics API's.

DISCLOSURE OF THE INVENTION

A system, method and computer program product are provided for programmable pixel processing in a computer graphics pipeline. Initially, pixel data is received from a source buffer. Thereafter, programmable operations are performed on the pixel data in order to generate output. The operations are programmable in that a user may utilize instructions from a predetermined instruction set for generating the same. Such output is stored in a register.

In one embodiment of the present invention, the output stored in the register may be used in performing the programmable operations on the data. Further, the pixel data may include a position, a pixel diffuse color, a specular color, a fog value, and/or a plurality of texture coordinates.

In still another embodiment of the present invention, an operation may be performed involving the output. Such operation may include a scissor operation, a color format conversion, an alpha test operation, a z-buffer/stencil operation, a blend operation, a logic operation, a dither operation, and/or a writemask operation.

In yet another embodiment of the present invention, additional standard operations may be performed utilizing a standard graphics application program interface (API). For example, the API may include at least one of OpenGL® and D3D™.

As an option, the pixel data may be negated and/or swizzled prior to performing the programmable operations thereon. Further, the programmable operations may include a texture fetch operation. Such texture fetch operation may involve a slope.

In still yet another embodiment, the programmable operations may support multiple levels of precision. Such levels of precision may include full floating point, half floating point, and fixed point. Further, the programmable operations may be capable of converting the pixel data from a first level of precision to a second level of precision for packing the pixel data into a destination, performing calculations, or any other purpose. Optionally, the programmable operations may be capable of clamping the pixel data for packing the pixel data into a destination. The programmable operations may also be capable of removing, or "killing," the pixel data.

The instruction set of programmable operations may include a no operation, texture fetch, move, derivative, multiply, addition, multiply and addition, reciprocal, reciprocal square root, three component dot product, four component dot product, distance vector, minimum, maximum, pack, unpack, set on less than, set on greater or equal than, floor, fraction, kill pixel, exponential base two (2), logarithm base two (2), and light coefficients.

By this design, the present invention allows a user to program a portion of the graphics pipeline that handles pixel processing. This results in an increased flexibility in generating visual effects. Further, the programmable pixel processing of the present invention allows remaining portions of the graphics pipeline, i.e. primitive processing, to be controlled by a standard graphics application program interface (API) for the purpose of preserving hardware optimizations.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIG. 5 is a detailed table showing various attributes handled by the pixel source buffer; and FIG. 6 illustrates an instruction set of programmable operations that may be carried out by one embodiment of the present invention.

DESCRIPTION OF THE PREFERRED EMBODIMENTS

Figure 1:
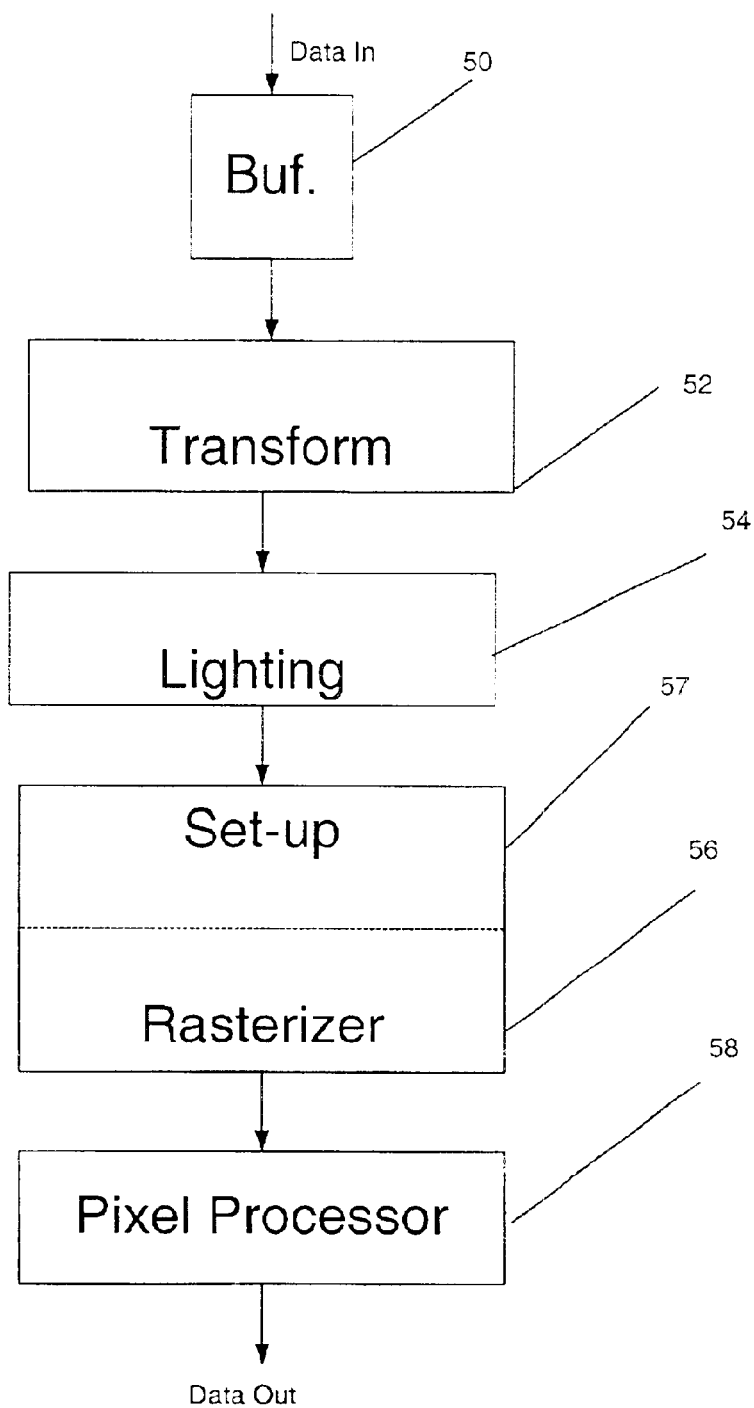
FIG. 1 is a schematic diagram illustrating a graphics pipeline in accordance with one embodiment of the present invention.

FIG. 1 is a schematic diagram illustrating a graphics pipeline in accordance with one embodiment of the present invention. As shown, the present embodiment involves a plurality of modules including an attribute buffer 50, a transform module 52, a lighting module 54, a rasterization module 56 with a set-up module 57, and a pixel processing module 58.

As an option, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the present invention may also be implemented on multiple semiconductor platforms and/or utilizing a conventional CPU and bus implementation.

During operation, the buffer 50 is included for gathering and maintaining a plurality of attributes. Completed vertices are processed by the transform module 52 and then sent to the lighting module 54. The transform module 52 generates parameters for the lighting module 54 to light. The output of the lighting module 54 is screen space data suitable for the set-up module which, in turn, sets up primitives. Thereafter, rasterization module 56 carries out rasterization of the primitives. In particular, the rasterization module 56 passes on pixel data including, but not limited to a position, a pixel diffuse color, a specular color, a fog value, a plurality of texture coordinates, and/or any other information relating to the pixels involved with the processing in the graphics pipeline.

A pixel processing module 58 is coupled to the rasterization module 56 for processing the pixel data. The pixel processing module 58 begins by reading the pixel data generated by the rasterization module 56. In operation, the pixel processing module 58 outputs a color and a depth value.

Table 1 illustrates operations that may be done after the pixel processing module 58 is finished. A standard application program interface (API) state may be used as appropriate, as will soon become apparent.

TABLE 1

Figure 2:
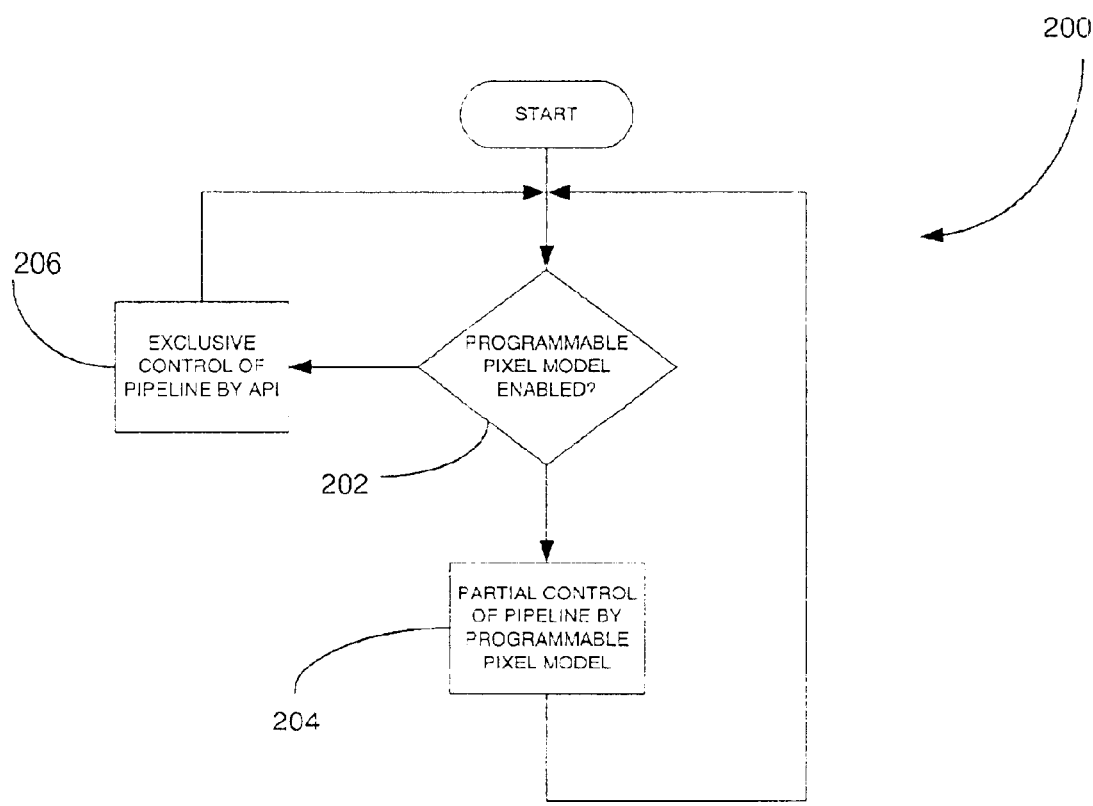
FIG. 2 illustrates the overall operation of the various components of the graphics pipeline of FIG. 1.

Scissor
Color Format Conversion
Alpha Test
Zbuffer/Stencil
Blendfunction
Logicop
Dither
Writemask FIG. 2 illustrates a high level operation 200 of the pixel processing module 58 of FIG. 1. As shown, it is constantly determined in decision 202 whether current operation invokes a programmable pixel model of the present invention. If so, a mode is enabled that partially supercedes the pixel processing of the standard graphics API, thus providing increased flexibility in generating visual effects. See operation 204.

When disabled, the present invention allows increased or exclusive control of the graphics pipeline by the standard graphics API, as indicated in operation 206. In one embodiment, states of the standard graphics API may not be overruled by invoking the programmable pixel mode of the present invention. In one embodiment, no graphics API state may be directly accessible by the present invention, with the exception of the bound texture state.

In one embodiment, the standard graphics API may include Open Graphics Library (OpenGL®) and/or D3D™ APIs. OpenGL® in the computer industry's standard API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects. OpenGL® and D3D™ APIs are commonly known to those of ordinary skill, and more information on the same may be had by reference to the OpenGL® specification Version 2.1, which is incorporated herein by reference in its entirety.

As is well known, OpenGL® mandates a certain set of configurable computations defining transformation, texture coordinate generation and transformation, and lighting. Several extensions have been developed to provide further computations to OpenGL®.

Figure 3:
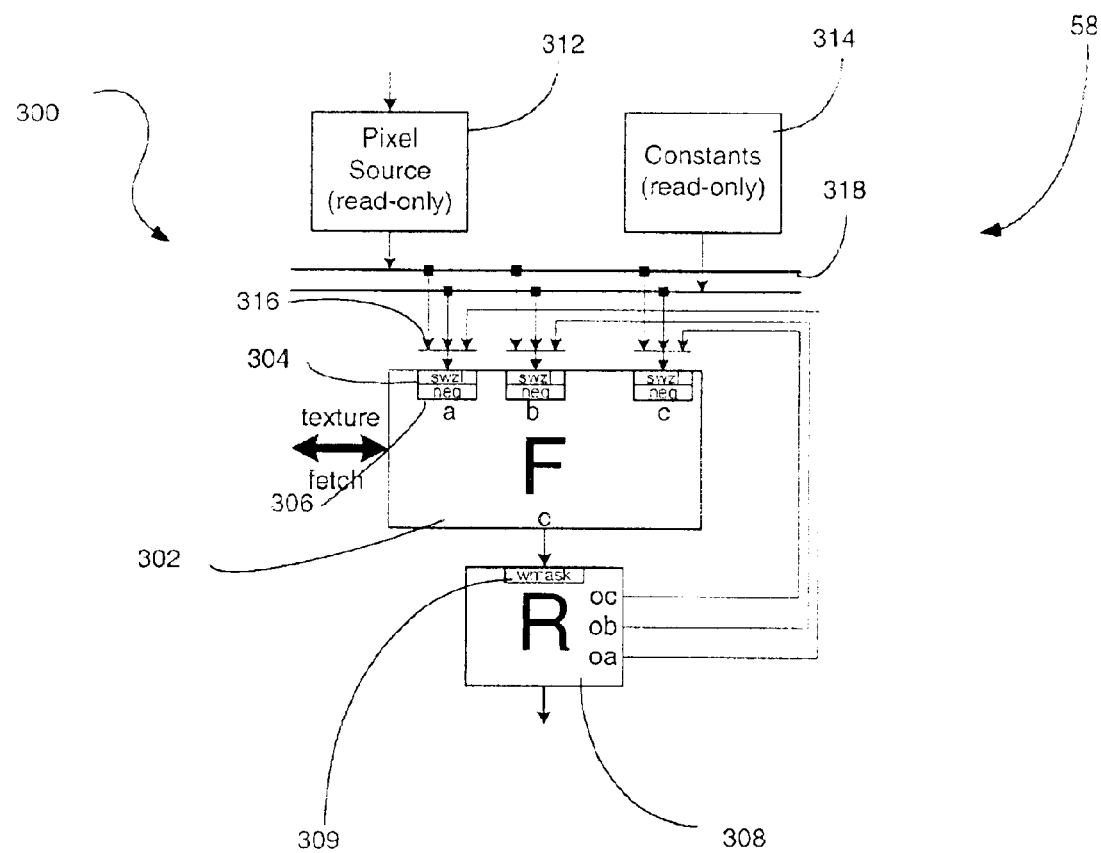
FIG. 3 is a schematic diagram illustrating an exemplary model of the pixel processing module in accordance with one embodiment of the present invention.

FIG. 3 is a schematic diagram illustrating an exemplary model 300 of the pixel processing module 58 in accordance with one embodiment of the present invention. Such programming model 300 may be adapted to work with hardware accelerators of various configuration and/or with central processing unit (CPU) processing.

As shown in FIG. 3, the pixel processing module 58 includes a functional module 302 that is capable of carrying out a plurality of different types of operations. The functional module 302 is equipped with three inputs and an output. Associated with each of the three inputs are a swizzling module 304 and a negating module 306 for purposes that will be set forth hereinafter in greater detail. Data swizzling is useful when generating vectors. Such technique allows the efficient generation of a vector cross product and other vectors.

The functional module 302 is capable of carrying out programmable operations and supporting multiple levels of precision. Such levels of precision may include full floating point (i.e. 32-bit), half floating point (i.e. 16-bit), and fixed point. More information regarding the programmable operations and the various levels of precision will be set forth hereinafter in greater detail.

Coupled to the output of the functional module 302 is an input of a register file 308 having three outputs. The register file 308 is also equipped with a vector component writemask module 309. The register file 308 has single write and triple read access. The contents of the register file 308 are initialized to (0,0,0,0) at the start of program execution.

Also included are a pixel source buffer 312 and a constant source buffer 314. The pixel source buffer 312 stores data in the form of pixel data, and may be equipped with write access and/or at least single read access. The constant source buffer 314 stores data in the form of constant data, and may also be equipped with write access and/or at least single read access. It may be read using an absolute address.

In one exemplary embodiment, the pixel source buffer 312 is twelve (12) quad-floats in size (12*128 bits). Operation of the pixel processor module 58 may be commenced when all pixel attributes are valid. The position contains x and y in integer (D3D™) and +0.5 (OpenGL™) window coordinates, z is normalized to the range (0,1), and 1/w is in homogeneous clip space. Such attributes may be mandatory in the current exemplary embodiment. The pixel attributes may also be perspective correct. The colors and fog value may be generated at a lower precision, while the texture coordinates may be generated in high precision, i.e. 32-bit floating point. FIG. 5 is a detailed table 500 showing various attributes handled by the pixel source buffer 312.

Each of the inputs of the functional module 302 is equipped with a multiplexer 316. This allows the outputs of the register file 308, pixel source buffer 312, and constant source buffer 314 to be fed to the inputs of the functional module 302. This is facilitated by buses 318.

While not shown, the functional module 302 may also be coupled to a texture fetch module (not shown) for fetching texture data. Such texture fetch module may also be coupled to the register file 308. It should be noted that frame buffer contents are only visible to the pixel processing module 58 via texture fetches.

There need not necessarily be an explicit connection between texture coordinates and the textures that they may access. It is possible to use the same coordinate, or generated coordinates, to access any of the active textures as many times as desired and in any sequence desired. Programs are allowed access to sixteen (16) active textures. If an accessed texture is not bound, the texture fetch may return (0,0,0,0). The texture fetch instruction specifies the texture identifier desired (i.e. between 0 and 15). In one embodiment, texture components that are in fixed point form may have a bias (0.0,–0.5) and a multiply operation (2x, 1x) applied to them before they are returned to the pixel processing module 58. This capability need not necessarily apply to floating point texture components. A texture fetch may return the data at the destination precision.

The pixel processing module 58 of FIG. 3 works well with hardware accelerators. In use, pixels are processed independently. Only one pixel is visible to the pixel processing module 58. As an option, there may be one 4-bit condition code register initialized as equal to 0 at program start.

Figure 4:
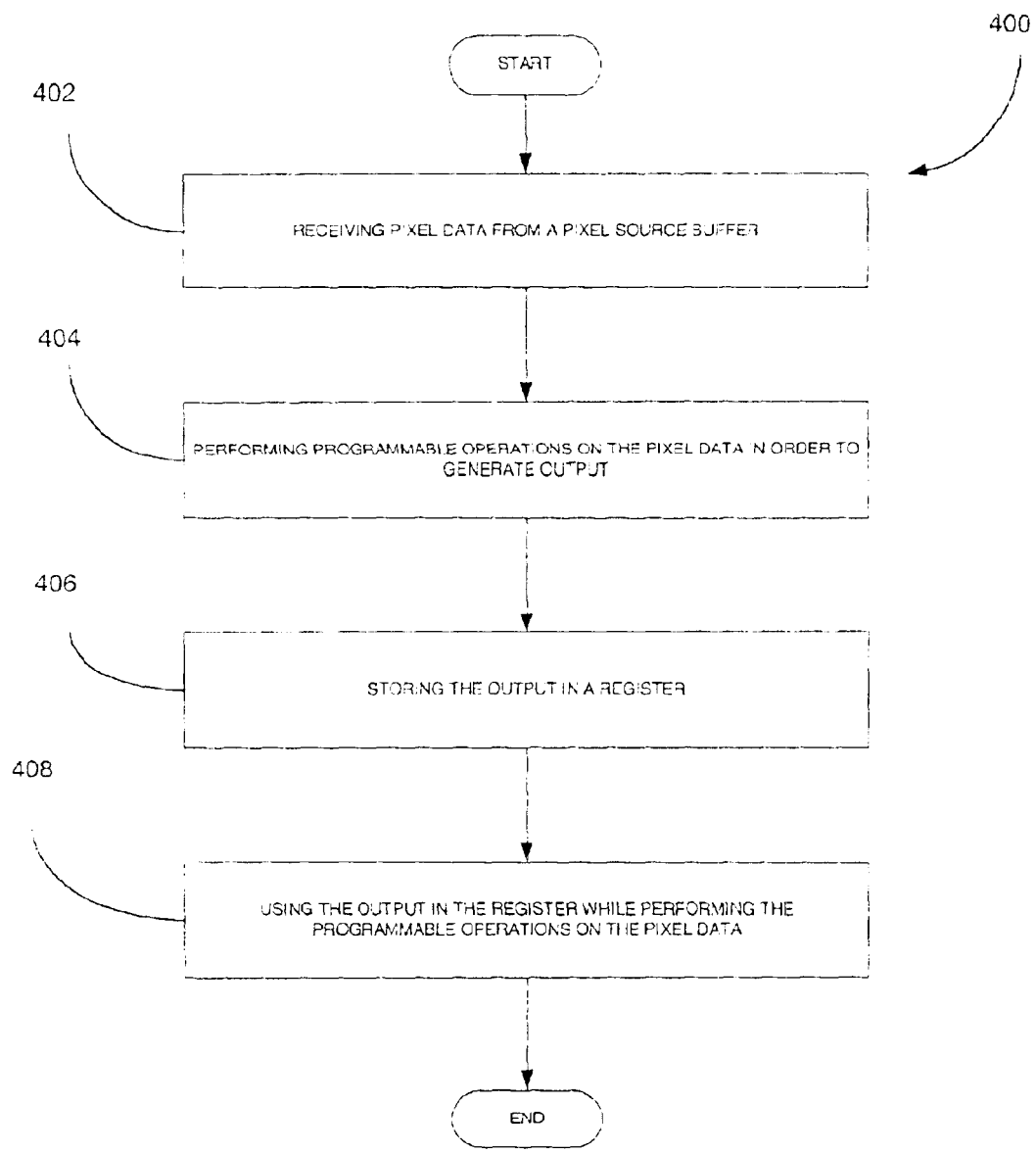
FIG. 4 is a flowchart illustrating the method by which the programming model of FIG. 3 carries out programmable pixel processing in the computer graphics pipeline.

FIG. 4 is a flowchart illustrating the method 400 by which the model of FIG. 3 carries out programmable pixel processing in the computer graphics pipeline. Initially, in operation 402, data is received from a pixel source buffer 312. Such data may include any type of information that is involved during the processing of pixels in the computer graphics pipeline. Further, the pixel source buffer 312 may include any type of memory capable of storing data.

Thereafter, in operation 404, programmable operations, i.e. pixel processing 102, are performed on the data in order to generate output. The programmable operations are capable of generating output that may be stored in the register file 308 in operation 406. During operation 408, the output stored in the register file 308 is used in performing the programmable operations on the data. Thus, the register file 308 may include any type of memory capable of allowing the execution of the programmable operations on the output.

By this design, the present invention allows a user to program a portion of the graphics pipeline that handles pixel processing. This results in an increased flexibility in generating visual effects. Further, the programmable pixel processing of the present invention allows remaining portions of the graphics pipeline to be controlled by the standard API for the purpose of preserving hardware optimizations.

During operation, only one pixel is processed at a time in the functional module 302 that performs the programmable operations. As such, the pixels may be processed independently. Further, the various foregoing operations may be processed for multiple pixels in parallel.

In one embodiment of the present invention, a constant may be received, and the programmable operations may be performed based on the constant. During operation, the constant may be stored in and received from the constant source buffer 314. Further, the constant may be accessed in the constant source buffer 314 using an absolute or relative address. As an option, there may be one or more address registers for use during reads from the constant source buffer 314. It may be initialized to "0" at the start of program execution in operation 204 of FIG. 2. Further, the constant source buffer 314 may be written with a program which may or may not be exposed to users.

The register file 308 may be equipped with single write and triple read access. Register contents may be initialized to (0,0,0,0) at the start of program execution in operation 204 of FIG. 2.

FIG. 6 illustrates an instruction set of programmable operations 600 that may be carried out by the present invention, in accordance with one embodiment. As shown in FIG. 6, such programmable operations 600 include a no operation, texture fetch, move, derivative, multiply, addition, multiply and addition, reciprocal, reciprocal square root, three component dot product, four component dot product, distance vector, minimum, maximum, pack, unpack, set on less than, set on greater or equal than, floor, fraction, kill pixel, exponential base two (2), logarithm base two (2), and light coefficients.

An exemplary assembly language will now be set forth in the context of which the foregoing operations may be executed. Such language refers to a plurality of resources delineated in Table 2. Note the correspondence with the various components of the model 300 of FIG. 3.

TABLE 2

| Pixel Source (192B) | p[*] | of size | 12 vectors |
|---|---|---|---|
| Constant Memory (512B) | c[*] | of size | 32 vectors |
| Data Registers/ Output (128B) | R0–R7,H0–H15, I0–I7 | of size | 8,16,8 vectors |
| Condition Codes | RC,HC,IC | of size | 4 bits |
| Instruction Storage | | of size | 128 instructions |

The data registers and memory locations include four component floating point precision. Further, the registers may be accessed as full floating point precision (fp32:R0–R7), half floating point precision (fp16: H0–H15), or signed 12-bit fixed point precision (s12:I0–I7). These overlap as follows: R0/H0–H1/I0–I1,R1/H2–H3/I2–I3, R2/H4–H5/I4–I5, etc.

Vector components may be swizzled before use via four subscripts (xyzw). An arbitrary component re-mapping may be done. Some examples are shown in Table 3.

TABLE 3

.xyzw means source(x,y,z,w) -> input(x,y,z,w)
.zzxy means source(x,y,z,w) -> input(z,z,x,y)
.xxxx means source(x,y,z,w) -> input(x,x,x,x)
Shortcuts: no subscripts refers to .xyzw (same as writemask)
                .x is the same as .xxxx
                .y is the same as .yyyy
                .z is the same as .zzzz
                .w is the same as .wwww All source operands (except condition codes) may be negated by putting a '−' sign in front. The condition codes can be changed whenever data is written (by adding a 'c' to the op-code) and sharing the writemask with the destination. If there is no other destination, RC or HC or IC may be used as a dummy write register. When data is written, each component may compared to 0.0 and its status recorded if the writemask for that component is enabled.

The condition codes are sourced as EQ(equal), NE(not equal), LT(less), GE(greater or equal), LE(less or equal), GT(greater), FL(false), and TR(true), which generates four (4) bits of condition code by applying the specified comparison. As a source (for KIL and writemask modification), the condition codes may be swizzled.

Writes to the register, condition codes, and RC are maskable. Each component is written only if it appears as a destination subscript (from xyzw). Specifying no writemask is the same as a writemask of xyzw. No swizzling may be possible for writemask, and subscripts may be ordered (x before y before z before w). It is also possible to modify the write mask by the condition codes (at the beginning of the instruction) by an 'AND' operation as set forth in Table 4. It should be noted that condition codes here have swizzle control.

TABLE 4

| destination(GT.x) | //writemask[4] = 1111 & GT.xxxx |
| destination.xw(EQ.yyzz) | //writemask[4] = x00w & EQ.yyzz |

An exemplary assembler format is set forth in Table 5.

TABLE 5

OPCODE DESTINATION.SOURCE(S)

Valid sources are the pixel source, constants, and registers. Valid destinations are registers, RC, HC, and IC. Output data is taken from the register file 308. It should be noted that vertex programs use the functional module 302 for output. A particular API mode allows selection of an output format for the color and depth values, and whether the program will generate a new depth value.

A blend function and alpha testing may or may not be available based on the color output format. For example, a blend function and alpha testing may be available if the selected color format is four (4) unsigned bytes. The final color is taken from register R0, H0, or I0. The final color vector, regardless of the precision format, may be stored into a frame buffer assuming a similarly sized color buffer.

If a depth value is to be generated, the final value of R1.x, H1.x, or I1.x holds the new depth value. If depth is not to be generated, the standard pipeline depth is used. Depth is normalized to a (0,1) range which is clamped and scaled by hardware to fit the final depth buffer test format. The depth writemask may apply.

As mentioned earlier, three formats are supported for vector components. More information regarding precision will now be set forth in the context of an exemplary embodiment. Table 6 illustrates each of the various formats.

TABLE 6

Floating point: fp32 (s.e8.m23)
Floating point: fp16 (s.e5.m10)
Signed fixed point: s12 (2.10 in 2's complement,
range of −2 to +2047/1024),
where:
fp32 refers to a 32-bit floating point precision
fp16 refers to a 16-bit floating point precision
s12 refers to fixed point precision It may not necessarily be possible to mix formats inside a vector. Further, in one embodiment, no floating point exceptions or interrupts may be supported. Denorms may be flushed to zero, and NaN may be treated as infinity. Negative 0.0 may also be treated as positive 0.0 in comparisons.

In 32-bit floating point mode, the RCP and RSQ instructions may deliver mantissa results accurate to $1.0/(2^{}22)$. Moreover, the approximate output (.z) in the EXP and LOG instructions only have to be accurate to $1.0/(2^{}11)$. The LIT instruction output (.z) allows error equivalent to the combination of the EXP and LOG combination implementing a power function.

In 16-bit floating point mode, the RCP, RSQ, LOG, and EXP instructions deliver results accurate to within one least significant bit of the correct answer. LIT has at least the accuracy of a LOG, multiply, and EXP sequence in 16-bit floating point mode. In fixed point mode, all calculations are performed and then clamped into the valid range.

Since distance is calculated as $(d*d)*(1/sqrt(d*d))$, 0.0 multiplied by infinity may be 0.0. Since if/then/else evaluation is done by multiplying by 1.0/0.0 and adding the values set forth in Table 7.

TABLE 7

| 0.0 * x = 0.0 | for all x (including infinity and NaN) |
| 1.0 * x = x | for all x (including infinity and NaN) |
| 0.0 + x = x | for all x (including infinity and NaN) |

In one embodiment, the registers may be grouped into 128-bit chunks, each of which may be used as a single 4*fp32 quad-float, two 4*fp16 quad-floats, or two 4*s12 quad-fixed point. There are eight (8) such chunks allowing a maximum of eight (8) registers in fp32 mode and sixteen (16) registers in fp16. It should be noted that there are only eight (8) s12 registers.

The present invention is allowed to use mixed precision registers as sources and destination to an instruction. In this case, conversion to destination precision is done before the instruction is executed. The instruction itself is performed at the destination precision.

If a 128-bit chunk is read in a different format from which it was last written, 0.0 is returned. Pixel source and constants may be in 32-bit floating point precision, but may be reduced to lower precision by the destination.

More information will now be set forth regarding each of the programmable operations 600 of FIG. 6.

No Operation (NOP)
Format:
NOP
Description:
No Operation.
Examples:
NOP
Texture Fetch (TEX,TXP,TXD)
Format:
TEX [c] D[.xyzw][(RC[.xyzw])],[–]S0[.xyzw], #tid
TXP [c] D[.xyzw][(RC[.xyzw])],[–]S0[.xyzw], #tid
TXD [c] D[.xyzw][(RC[.xyzw]]],[–]S0[.xyzw],[–]S1 [.xyzw],[–]S2[.xyzw],#tid
Description:
The contents of the source vector are used as a texture coordinate indexing into the specified (via tid: 0–15) texture map. The filtered vector resulting is placed into the destination as a quad-float. TEX generates a texture fetch of (x,y,z) while TXP generates a texture fetch of (x/w,y/w,z/w). TXD allows specification of the derivative in x (S1) and y (S2). These may be used for LOD/anisotropic calculations. TXD generates a texture fetch of (x,y,z).
Operation:
Table 8 sets forth an example of operation associated with the TEX, TXP, and TXD instructions.

TABLE 8 t.x = source0.c***;      /* c is x or y or z or w */
t.y = source0.*c**;
t.z = source0.**c*;
t.w = source0.***c;
if (-source0)
    t = -t;
q = TextureFetch(t,texid);
if (destination.x) R.x = q.x;
if (destination.y) R.y = q.y;
if (destination.z) R.z = q.z;
if (destination.w) R.w = q.w;

Examples:
TEX R2,R3,3 //Fetch from texture 3 using R3 as coords.
Derivative X (DDX)
Format:
DDX[c] D[.xyzw][(RC[.xyzw])],[–]S0[.xyzw]
Description:
DDX operates to ensure that the rate of change of the components of the source with respect to the horizontal axis 'X' are placed into the destination.
Operation:
Table 9 sets forth an example of operation associated with the DDX instruction.

TABLE 9 t.x = source0.c***;      /* c is x or y or z or w */
t.y = source0.*c**;
t.z = source0.**c*;
t.w = source0.***c;
if (-source0)
    t = -t;
q.x = d(t.x)/dx;
q.y = d(t.y)/dx;
q.z = d(t.z)/dx;

TABLE 9-continued q.w = d(t.w)/dx;
if (destination.x) R.x = q.x;
if (destination.y) R.y = q.y;
if (destination.z) R.z = q.z;
if (destination.w) R.w = q.w;

Examples:
DDX R2,R1 //Fetch x derivatives of R1
Derivative Y (DDY)
Format:
DDY[c] D[.xyzw][(RC[.xyzw])],[–]S0[.xyzw]
Description:
DDY operates to ensure that the rate of change of the components of the source with respect to the vertical axis 'Y' is placed into the destination.
Operation:
Table 10 sets forth an example of operation associated with the DDY instruction.

TABLE 10 t.x = source0.c***;      /* c is x or y or z or w */
t.y = source0.*c**;
t.z = source0.**c*;
t.w = source0.***c;
if (-source0)
    t = -t;
q.x = d(t.x)/dy;
q.y = d(t.y)/dy;
q.z = d(t.z)/dy;
q.w = d(t.w)/dy;
if (destination.x) R.x = q.x;
if (destination.y) R.y = q.y;
if (destination.z) R.z = q.z;
if (destination.w) R.w = q.w;

Examples:
DDY R2,R0 //Fetch y derivatives of R0
Move (MOV)
Format:
MOV[c] D[.xyzw][(RC[.xyzw])],[–]S0[.xyzw]
Description:
MOV operates to move the contents of the source into a destination.
Operation:
Table 11 sets forth an example of operation associated with the MOV instruction.

TABLE 11 t.x = source0.c***;      /* c is x or y or z or w */
t.y = source0.*c**;
t.z = source0.**c*;
t.w = source0.***c;
if (-source0)
    t = -t;
q.x = t.x;
q.y = t.y;
q.z = t.z;
q.w = t.w;
if (destination.x) R.x = q.x;
if (destination.y) R.y = q.y;
if (destination.z) R.z = q.z;
if (destination.w) R.w = q.w;

Examples:
MOV RC,–R3 //Compare negative R3 to 0.0 and save
MOV R2,p[POS].w //Move w component of v[POS] into xyzw components of R2

MOV R1.xyw,R2.x //Move x component of R2 into x,y,w components of R1

Multiply (MUL)

Format:

MUL[c] D[.xyzw][(RC[.xyzw])],[-]S0[.xyzw],[-]S1[.xyzw]

Description:

MUL operates to multiply sources into a destination. It should be noted that 0.0 times anything is 0.0.

Operation:

Table 12 sets forth an example of operation associated with the MUL instruction.

TABLE 12

```
t.x = source0.c***;     /* c is x or y or z or w */
t.y = source0.*c**;
t.z = source0.**c*;
t.w = source0.***c;
if (-source0)
    t = -t;
u.x = source1.c***;     /* c is x or y or z or w */
u.y = source1.*c**;
u.z = source1.**c*;
u.w = source1.***c;
if (-source1)
    u = -u;
q.x = t.x*u.x;
q.y = t.y*u.y;
q.z = t.z*u.z;
q.w = t.w*u.w;
if (destination.x) R.x = q.x;
if (destination.y) R.y = q.y;
if (destination.z) R.z = q.z;
if (destination.w) R.w = q.w;
```

Examples:

MUL H6,H5,c[CON5] //H6.xyzw=H5.xyzw*c[CON5].xyzw

MUL H6.x,H5.w,-H7 //H6.x=H5.w*-H7.x

Add (ADD)

Format:

ADD[c] D[.xyzw][(RC[.xyzw])],[-]S0[.xyzw],[-]S1[.xyzw]

Description:

ADD serves to add sources into a destination.

Operation:

Table 13 sets forth an example of operation associated with the ADD instruction.

TABLE 13

```
t.x = source0.c***;     /* c is x or y or z or w */
t.y = source0.*c**;
t.z = source0.**c*;
t.w = source0.***c;
if (-source0)
    t = -t;
u.x = source1.c***;     /* c is x or y or z or w */
u.y = source1.*c**;
u.z = source1.**c*;
u.w = source1.***c;
if (-source1)
    u = -u;
q.x = t.x + u.x;
q.y = t.y + u.y;
q.z = t.z + u.z;
q.w = t.w + u.w;
if (destination.x) R.x = q.x;
if (destination.y) R.y = q.y;
if (destination.z) R.z = q.z;
if (destination.w) R.w = q.w;
```

Examples:

ADD HC.x,H5.x,c[CON5] //Compare H5.x+c[CON5].x to 0.0 and set RC.x

ADD H6.x,H5,-H7 //H6.x=H5.x-H7.x

ADD H6,-H5,c[CON5] //H6.xyzw=-H5.xyzw+c[CON5].xyzw

Multiply And Add (MAD)

Format:

MAD[c] D[.xyzw][(RC[.xyzw])],[-]S0[.xyzw],[-]S1[.xyzw],[-]S2[.xyzw]

Description:

MAD serves to multiply and add sources into a destination. It should be noted that 0.0 times anything is 0.0.

Operation:

Table 14 sets forth an example of operation associated with the MAD instruction.

TABLE 14

```
t.x = source0.c***;     /* c is x or y or z or w */
t.y = source0.*c**;
t.z = source0.**c*;
t.w = source0.***c;
if (-source0)
    t = -t;
u.x = source1.c***;     /* c is x or y or z or w */
u.y = source1.*c**;
u.z = source1.**c*;
u.w = source1.***c;
if (-source1)
    u = -u;
v.x = source2.c***;     /* c is x or y or z or w */
v.y = source2.*c**;
v.z = source2.**c*;
v.w = source2.***c;
if (-source2)
    v = -v;
q.x = t.x*u.x + v.x;
q.y = t.y*u.y + v.y;
q.z = t.z*u.z + v.z;
q.w = t.w*u.w + v.w;
if (destination.x) R.x = q.x;
if (destination.y) R.y = q.y;
if (destination.z) R.z = q.z;
if (destination.w) R.w = q.w;
```

Examples:

MAD H6,-H5,p[POS],-H3 //H6=-H5*p[POS]-H3

MAD H6.z,H5.w,p[POS],H5 //H6.z=H5.w*p[POS].z+H5.z

Reciprocal (RCP)

Format:

RCP[c] D[.xyzw][(RC[.xyzw])],[-]S0.[xyzw]

Description:

RCP inverts source scalar into a destination. The source may have one subscript. Output may be exactly 1.0 if the input is exactly 1.0.

RCP(-Inf) gives (-0.0,-0.0,-0.0,-0.0)

RCP(-0.0) gives (-Inf,-Inf,-Inf,-Inf)

RCP(+0.0) gives (+Inf,+Inf, +Inf,+Inf)

RCP(+Inf) gives (0.0,0.0,0.0,0.0)

Operation:

Table 15 sets forth an example of operation associated with the RCP instruction.

TABLE 15

```
t.x = source0.c***;     /* c is x or y or z or w */
t.y = source0.*c**;
t.z = source0.**c*;
t.w = source0.***c;
```

TABLE 15-continued

```
if (-source0)
    t = -t;
if (t.x == 1.0)
    q.x = q.y = q.z = q.w = 1.0;
else
    q.x = q.y = q.z = q.w = 1.0/t.x;    where |q.x -
IEEE(1.0/t.x)| < 1/(2**22) for all 1.0 <= t.x < 2.0
if (destination.x) R.x = q.x;
if (destination.y) R.y = q.y;
if (destination.z) R.z = q.z;
if (destination.w) R.w = q.w;
```

Examples:

RCP R2,c[14].x //R2.xyzw=1/c[14].x

RCP R2.w,R3.z //R2. w=1/R3.z

Reciprocal Square Root (RSQ)

Format:

RSQ[c] D[.xyzw][(RC[.xyzw])],[-]S0.[xyzw]

Description:

RSQ performs an inverse square root of absolute value of source scalar into a destination. The source may have one subscript. Output may be exactly 1.0 if the input is exactly 1.0.

RSQ(0.0) gives (+Inf,+Inf, +Inf, +Inf)

RSQ(Inf) gives (0.0, 0.0, 0.0, 0.0)

Operation:

Table 16 sets forth an example of operation associated with the RSQ instruction.

TABLE 16

```
t.x = source0.c***;      /* c is x or y or z or w */
t.y = source0.*c**;
t.z = source0.**c*;
t.w = source0.***c;
if (-source0)
    t = -t;
if (t.x == 1.0)
    q.x = q.y = q.z = q.w = 1.0;
else
    q.x = q.y = q.z = q.w = 1.0/sqrt(abs(t.x)); with |q.x -
IEEE(1.0/sqrt(t.x))| < 1/(2**22) for 1.0 <= t.x < 4.0
if (destination.x) R.x = q.x;
if (destination.y) R.y = q.y;
if (destination.z) R.z = q.z;
if (destination.w) R.w = q.w;
```

Examples:

RSQ R3,R3.y //R3=1/sqrt(abs(R3.y))

RSQ R2.w,p[9].x //R2.w=1/sqrt(abs(p[9].x))

Three Component Dot Product (DP3)

Format:

DP3[c] D[.xyzw][(RC[.xyzw])],[-]S0[.xyzw],[-]S1 [.xyzw]

Description:

DP3 performs a three component dot product of the sources into a destination. It should be noted that 0.0 times anything is 0.0.

Operation:

Table 17 sets forth an example of operation associated with the DP3 instruction.

TABLE 17

```
t.x = source0.c***;      /* c is x or y or z or w */
t.y = source0.*c**;
t.z = source0.**c*;
```

TABLE 17-continued

```
t.w = source0.***c;
if (-source0)
    t = -t;
u.x = source1.c***;      /* c is x or y or z or w */
u.y = source1.*c**;
u.z = source1.**c*;
u.w = source1.***c;
if (-source1)
    u = -u;
q.x = q.y = q.z = q.w = t.x*u.x + t.y*u.y + t.z*u.z;
if (destination.x) R.x = q.x;
if (destination.y) R.y = q.y;
if (destination.z) R.z = q.z;
if (destination.w) R.w = q.w;
```

Examples:

DP3 H6,H3,H4 //H6.xyzw=H3.x*H4.x+H3.y*H4.y+ H3.z*H4.z

DP3 H6.w,H3,H4 //H6.w=H3.x*H4.x+H3.y*H4.y+ H3.z*H4.z

Four Component Dot Product (DP4)

Format:

DP4[c] D[.xyzw][(RC[.xyzw])],[-]S0[.xyzw],[-]S1 [.xyzw]

Description:

DP4 performs a four component dot product of the sources into a destination. It should be noted that 0.0 times anything is 0.0.

Operation:

Table 18 sets forth an example of operation associated with the DP4 instruction.

TABLE 18

```
t.x = source0.c***;      /* c is x or y or z or w */
t.y = source0.*c**;
t.z = source0.**c*;
t.w = source0.***c;
if (-source0)
    t = -t;
u.x = source1.c***;      /* c is x or y or z or w */
u.y = source1.*c**;
u.z = source1.**c*;
u.w = source1.***c;
if (-source1)
    u = -u;
q.x = q.y = q.z = q.w = t.x*u.x + t.y*u.y + t.z*u.z +
t.w*u.w;
if (destination.x) R.x = q.x;
if (destination.y) R.y = q.y;
if (destination.z) R.z = q.z;
if (destination.w) R.w = q.w;
```

Examples:

DP4 H6,p[POS],c[MVO] //H6.xyzw=p.x*c.x+p.y*c.y+ p.z*c.z+p.w*c.w

DP4 H6.xw,p[POS].w,H3 //H6.xw=p.w*H3.x+ p.w*H3.y+p.w*H3.z+p.w*H3.w

Distance Vector (DST)

Format:

DST[c] D[.xyzw][(RC[.xyzw])],[-]S0[.xyzw],[-]S1 [.xyzw]

Description:

DST calculates a distance vector. A first source vector is assumed to be (NA,d*d,d*d,NA) and second source vector is assumed to be (NA,1/d,NA,1/d). A destination vector is then (1,d,d*d,1/d). It should be noted that 0.0 times anything is 0.0.

Operation:

Table 19 sets forth an example of operation associated with the DST instruction.

TABLE 19

```
t.x = source0.c***;       /* c is x or y or z or w */
t.y = source0.*c**;
t.z = source0.**c*;
t.w = source0.***c;
if (-source0)
    t = -t;
u.x = source1.c***;       /* c is x or y or z or w */
u.y = source1.*c**;
u.z = source1.**c*;
u.w = source1.***c;
if (-source1)
    u = -u;
q.x = 1.0;
q.y = t.y*u.y;
q.z = t.z;
q.w = u.w;
if (destination.x) R.x = q.x;
if (destination.y) R.y = q.y;
if (destination.z) R.z = q.z;
if (destination.w) R.w = q.w;
```

Examples:
 DST R2,R3,H4 //R2.xyzw=(1.0, R3.y*H4.y,R3.z,H4.w)

Minimum (MIN)

Format:
 MIN[c] D[.xyzw][(RC[.xyzw])],[-]S0[.xyzw],[-]S1[.xyzw]

Description:
 MIN serves to move a minimum of sources into a destination.

Operation:
 Table 20 sets forth an example of operation associated with the MIN instruction.

TABLE 20

```
t.x = source0.c***;       /* c is x or y or z or w */
t.y = source0.*c**;
t.z = source0.**c*;
t.w = source0.***c;
if (-source0)
    t = -t;
u.x = source1.c***;       /* c is x or y or z or w */
u.y = source1.*c**;
u.z = source1.**c*;
u.w = source1.***c;
if (-source1)
    u = -u;
q.x = (t.x < u.x) ? t.x : u.x;
q.y = (t.y < u.y) ? t.y : u.y;
q.z = (t.z < u.z) ? t.z : u.z;
q.w = (t.w < u.w) ? t.w : u.w;
if (destination.x) R.x = q.x;
if (destination.y) R.y = q.y;
if (destination.z) R.z = q.z;
if (destination.w) R.w = q.w;
```

Examples:
 MIN R2,R3,H0 //R2=component min (R3,H0)
 MIN R2.x,R3.z,H0 //R2.x=min (R3.z,H0.x)
 MIN CH,R3.z,H0 //Compare min (R3.z,H0.xyzw) to 0.0 and set RC Maximum (MAX)

Format:
 MAX[c] D[.xyzw][(RC[.xyzw])],[-]S0[.xyzw],[-]S1[.xyzw]

Description:
 MAX moves a maximum of sources into a destination.

Operation:
 Table 21 sets forth an example of operation associated with the MAX instruction.

TABLE 21

```
t.x = source0.c***;       /* c is x or y or z or w */
t.y = source0.*c**;
t.z = source0.**c*;
t.w = source0.***c;
if (-source0)
    t = -t;
u.x = source1.c***;       /* c is x or y or z or w */
u.y = source1.*c**;
u.z = source1.**c*;
u.w = source1.***c;
if (-source1)
    u = -u;
q.x = (t.x >= u.x) ? t.x : u.x;
q.y = (t.y >= u.y) ? t.y : u.y;
q.z = (t.z >= u.z) ? t.z : u.z;
q.w = (t.w >= u.w) ? t.w : u.w;
if (destination.x) R.x = q.x;
if (destination.y) R.y = q.y;
if (destination.z) R.z = q.z;
if (destination.w) R.w = q.w;
```

Examples:
 MAX R2,R3,H0 //R2=component max (R3,H0)
 MAX R2.w,R3.x,H0 //R2.w=max(R3.x,H0.w)

Pack2 (PK2)

Format:
 PK2[c] D[.xyzw][(RC[.xyzw])],[-]S0[.xyzw]

Description:
 PK2 packs two source components (.xy after swizzle) into a destination. The destination may be a fp32 "R" register. The source components are converted into fp16 format and packed into a destination.

Operation:
 Table 22 sets forth an example of operation associated with the PK2 instruction.

TABLE 22

```
t.x = source0.c***;       /* c is x or y or z or w */
t.y = source0.*c**;
t.x = source0.**c*;
t.w = source0.***c;
if (-source0)
    t = -t;
t.x = fp16(t.x);
t.y = fp16(t.y);
q.x = q.y = q.z = q.w = ((t.x) | (t.y << 16));    /* raw
bit packing */
if (destination.x) R.x = q.x;
if (destination.y) R.y = q.y;
if (destination.z) R.z = q.z;
if (destination.w) R.w = q.w;
```

Examples:
 PK2 R0.z,R3 //pack x,y components of R3 into R0.z

Pack4 (PK4)

Format:
 PK4[c] D[.xyzw][(RC[.xyzw])],[-]S0[.xyzw]

Description:
 PK4 packs four source components into a destination. The destination may be a fp32 "R" register. The source components are clamped to the range (-1.008,1.0) before being packed into a destination as unsigned 8 bit bytes.

Operation:
 Table 23 sets forth an example of operation associated with the PK4 instruction.

TABLE 23

```
t.x = source0.c***;    /* c is x or y or z or w */
t.y = source0.*c**;
t.z = source0.**c*;
t.w = source0.***c;
if (-source0)
    t = -t;
q.x = t.x; if (q.x > 1.0) q.x = 1.0; else if
(q.x < -1.008) q.x = -1.008;
q.y = t.y; if (q.y > 1.0) q.y = 1.0; else if
(q.y < -1.008) q.y = -1.008;
q.z = t.z; if (q.z > 1.0) q.z = 1.0; else if
(q.z < -1.008) q.z = -1.008;
q.w = t.w; if (q.w > 1.0) q.w = 1.0; else if
(q.w < -1.008) q.w = -1.008;
ub.x = 127.0*q.x + 128;  /* ub is unsigned byte vector */
ub.y = 127.0*q.y + 128;
ub.z = 127.0*q.z + 128;
ub.w = 127.0*q.w + 128;
q.x = q.y = q.z = q.w = ((ub.x) | (ub.y << 8) | (ub.z << 16) |
(ub.w << 24));  /* raw bit packing */
if (destination.x) R.x = q.x;
if (destination.y) R.y = q.y;
if (destination.z) R.z = q.z;
if (destination.w) R.w = q.w;
```

Examples:
    PK4 R0.z,R3 //pack 4 components of R3 into R0.z

Unpack2 (UP2)

Format:
    UP2[c] D[.xyzw][(RC[.xyzw])],[-]S0.[xyzw]

Description:
    UP2 unpacks source component into a destination. The source may be a fp32 "R" register scalar. The source component is assumed to be a packed fp16 pair.

Operation:
    Table 24 sets forth an example of operation associated with the UP2 instruction.

TABLE 24

```
t.x = source0.c***;    /* c is x or y or z or w */
t.y = source0.*c**;
t.z = source0.**c*;
t.w = source0.***c;
if (-source0)
    t = -t;
q.x = q.z = (t.x >> 0) & 0xffff;     /* use raw bits of t.x */
q.y = q.w = (t.x >> 16) & 0xffff;    /* use raw bits of t.x */
if (destination.x) R.x = q.x;
if (destination.y) R.y = q.y;
if (destination.z) R.z = q.z;
if (destination.w) R.w = q.w;
```

Examples:
    UP2 R0.xy,R3.y //unpack two components of R3.y into R0.xy

Unpack4 (UP4)

Format:
    UP4[c] D[.xyzw][(RC[.xyzw])],[-]S0.[xyzw]

Description:
    UP4 unpacks source component into a destination. The source may be a fp32 "R" register scalar. The source component is assumed to be a packed unsigned 8-bit quartet and all are biased and scaled back into the range (-1.008, 1.0) before assignment to destination.

Operation:
    Table 25 sets forth an example of operation associated with the UP4 instruction.

TABLE 25

```
t.x = source0.c***;    /* c is x or y or z or w */
t.y = source0.*c**;
t.z = source0.**c*;
t.w = source0.***c;
if (-source0)
    t = -t;
q.x = (t.x >> 0) & 0 x ff;     /* use raw bits of t.x */
q.y = (t.x >> 8) & 0 x ff;     /* use raw bits of t.x */
q.z = (t.x >> 16) & 0 x ff;    /* use raw bits of t.x */
q.w = (t.x >> 24) & 0 x ff;    /* use raw bits of t.x */
q.x = (q.x - 128)/127.0;
q.y = (q.y - 128)/127.0;
q.z = (q.z - 128)/127.0;
q.w = (q.w - 128)/127.0;
if (destination.x) R.x = q.x;
if (destination.y) R.y = q.y;
if (destination.z) R.z = q.z;
if (destination.w) R.w = q.w;
```

Examples:
    UP4 R0,R3.x // unpack four components of R3.x into R0.xyzw

Set On Less Than (SLT)

Format:
    SLT[c] D[.xyzw][(RC[.xyzw])],[-]S0[.xyzw],[-]S1[.xyzw]

Description:
    SLT sets the destination to 1.0/0.0 if source0 is less—than/greater_or_equal to source1. The following relationships should be noted:
    SetEQ R0,R1=(SGE R0,R1)*(SGE-R0,-R1)
    SetNE R0,R1=(SLT R0,R1)+(SLT-R0,-R1)
    SetLE R0,R1=SGE-R0,-R1
    SetGT R0,R1=SLT-R0,-R1

Operation:
    Table 26 sets forth an example of operation associated with the SLT instruction.

TABLE 26

```
t.x = source0.c***;    /* c is x or y or z or w */
t.y = source0.*c**;
t.z = source0.**c*;
t.w = source0.***c;
if (-source0)
    t = -t;
u.x = source1.c***;    /* c is x or y or z or w */
u.y = source1.*c**;
u.z = source1.**c*;
u.w = source1.***c;
if (-source1)
    u = -u;
q.x = (t.x < u.x) ? 1.0 : 0.0;
q.y = (t.y < u.y) ? 1.0 : 0.0;
q.z = (t.z < u.z) ? 1.0 : 0.0;
q.w = (t.w < u.w) ? 1.0 : 0.0;
if (destination.x) R.x = q.x;
if (destination.y) R.y = q.y;
if (destination.z) R.z = q.z;
if (destination.w) R.w = q.w;
```

Examples:
    SLT H4,H3,H7 //H4.xyzw=(H3.xyzw<H7.xyzw?1.0:0.0)
    SLT H3.xz,H6.w,H4 //H3.xz=(H6.w<H4.xyzw?1.0:0.0)

Set On Greater Or Equal Than (SGE)

Format:
    SGE[c] D[.xyzw][(RC[.xyzw])],[-]S0[.xyzw],[-]S1[.xyzw]

Description:
    SGE sets the destination to 1.0/0.0 if source0 is greater_or_equal/less_than source1.

Operation:

Table 27 sets forth an example of operation associated with the SGE instruction.

TABLE 27

```
t.x = source0.c***;      /* c is x or y or z or w */
t.y = source0.*c**;
t.z = source0.**c*;
t.w = source0.***c;
if (-source0)
    t = -t;
u.x = source1.c***;      /* c is x or y or z or w */
u.y = source1.*c**;
u.z = source1.**c*;
u.w = source1.***c;
if (-source1)
    u = -u;
q.x = (t.x >= u.x) ? 1.0 : 0.0;
q.y = (t.y >= u.y) ? 1.0 : 0.0;
q.z = (t.z >= u.z) ? 1.0 : 0.0;
q.w = (t.w >= u.w) ? 1.0 : 0.0;
if (destination.x) R.x = q.x;
if (destination.y) R.y = q.y;
if (destination.z) R.z = q.z;
if (destination.w) R.w = q.w;
```

Examples:

SGE H4,H3,H7 //H4.xyzw=(H3.xyzw>=H7.xyzw?1.0:0.0)

SGE H3.xz,H6.w,H4 //H3.xz=(H6.w>=H4.xyzw?1.0:0.0)

Floor (FLR)

Format:

FLR[c] D[.xyzw][(RC[.xyzw])],[-]S0[.xyzw]

Description:

FLR set the destination to floor of source.

Operation:

Table 28 sets forth an example of operation associated with the FLR instruction.

TABLE 28

```
t.x = source0.c***;      /* c is x or y or z or w */
t.y = source0.*c**;
t.z = source0.**c*;
t.w = source0.***c;
if (-source0)
    t = -t;
q.x = floor(t.x);
q.y = floor(t.y);
q.z = floor(t.z);
q.w = floor(t.w);
if (destination.x) R.x = q.x;
if (destination.y) R.y = q.y;
if (destination.z) R.z = q.z;
if (destination.w) R.w = q.w;
```

Examples:

FLR H4.z,R3 //H4.z=floor(R3.z)

Fraction (FRC)

Format:

FRC[c] D[.xyzw][(RC[.xyzw])],[-]S0[.xyzw]

Description:

FRC sets a destination to a fractional part of a source. The fraction is 0.0<=fraction<1.0.

Operation:

Table 29 sets forth an example of operation associated with the FRC instruction.

TABLE 29

```
t.x = source0.c***;      /* c is x or y or z or w */
t.y = source0.*c**;
t.z = source0.**c*;
t.w = source0.***c;
if (-source0)
    t = -t;
q.x = t.x - floor(t.x);
q.y = t.y - floor(t.y);
q.z = t.z - floor(t.z);
q.w = t.w - floor(t.w);
if (destination.x) R.x = q.x;
if (destination.y) R.y = q.y;
if (destination.z) R.z = q.z;
if (destination.w) R.w = q.w;
```

Examples:

FRC H4.z,R3 //H4.z=R3.z-floor(R3.z)

Kill Pixel (KIL)

Format:

KIL RC[.xyzw]

Description:

KIL kills the pixel based on any of the RC bits (post swizzle) being TRUE. KIL cannot set the condition codes.

Operation:

Table 30 sets forth an example of operation associated with the KIL instruction.

TABLE 30

```
b.x = RC.c***;      /* c is x or y or z or w */
b.y = RC.*c**;
b.z = RC.**c*;
b.w = RC.***c;
if (b.x | b.y | b.z | b.w)
    Kill pixel;
```

Examples:

KIL EQ //Kill pixel if RC x or y or z or w are=0.0

KIL LT.x //Kill pixel if RC x bit<0.0

KIL NE.xxzz //Kill pixel if x or z RC bits!=0.0

Exponential Base 2 (EXP)

Format:

EXP[c] D[.xyzw][(RC[.xyzw])],[-]S0.[xyzw]

Description:

EXP generates an approximate answer in dest.z and allows for a more accurate answer of dest.x*FUNC(dest.y) where FUNC is some user approximation to 2**dest.y (0.0<=dest.y<1.0). EXP accepts a scalar source0. Reduced precision arithmetic is acceptable in evaluating dest.z.

EXP(-Inf) or underflow gives (0.0,0.0,0.0,1.0)

EXP(+Inf) or overflow gives(+Inf,0.0,+Inf,1.0)

Operation:

Table 31 sets forth an example of operation associated with the EXP instruction.

TABLE 31

```
t.x = source0.c***;      /* c is x or y or z or w */
t.y = source0.*c**;
t.z = source0.**c*;
t.w = source0.***c;
if (-source0)
    t = -t;
q.x = 2**TruncateTo-Infinity(t.x);
q.y = t.x - TruncateTo-Infinity(t.x);
q.z = q.x * APPX(q.y);                          where
|exp(q.y*LN2) - APPX(q.y) | < 1/(2**11) for all 0<=q.y<1.0
```

TABLE 31-continued

```
q.w = 1.0;
if (destination.x) R.x = q.x;
if (destination.y) R.y = q.y;
if (destination.z) R.z = q.z;
if (destination.w) R.w = q.w;
```

Examples:
  EXP H4,R3.z
Logarithm Base 2 (LOG)
Format:
  LOG[c] D[.xyzw][(RC[.xyzw])],[–]S0.[xyzw]
Description:
  LOG generates an approximate answer in dest.z and allows for a more accurate answer of dest.x+FUNC(dest.y) where FUNC is some user approximation of log2(dest.y) (1.0<=dest.y<2.0). LOG accepts a scalar source0 of which the sign bit is ignored. LOG provides reduced precision arithmetic is acceptable in evaluating dest.z.
  LOG(0.0) gives (–Inf,1.0,–Inf,1.0)
  LOG(Inf) gives (Inf,1.0,Inf,1.0)
Operation:
  Table 32 sets forth an example of operation associated with the LOG instruction.

TABLE 32

```
t.x = source0.c***;       /* c is x or y or z or w */
t.y = source0.*c**;
t.z = source0.**c*;
t.w = source0.***c;
if (-source0)
    t = -t;
if (abs(t.x) != 0.0) {
    q.x = exponent(t.x)    (-128.0 <= e < 127)
    q.y = mantissa(t.x)    (1.0 <= m < 2.0)
    q.z = q.x + APPX(q.y)  where |log(q.y)/LN2-APPX(q.y)|
      < 1/(2**11) for all 1.0<=q.y<2.0
    q.w = 1.0;
    }
else {
    q.x = -inf; q.y = 1.0; q.z = -inf; q.w = 1.0;
    }
if (destination.x) R.x = q.x;
if (destination.y) R.y = q.y;
if (destination.z) R.z = q.z;
if (destination.w) R.w = q.w;
```

Examples:
  LOG H4,R3.z
Light Coefficients (LIT)
Format:
  LIT[c] D[.xyzw][(RC[.xyzw])],[–]S0[.xyzw]
Description:
  LIT provides lighting partial support. LIT calculates lighting coefficients from two dot products and a power (which gets clamped to –128.0<power<128.0). Source vector is:
  Source0.x=n*l (unit normal and light vectors)
  Source0.y=n*h (unit normal and halfangle vectors)
  Source0.z is unused
  Source0.w=power
  Reduced precision arithmetic is acceptable in evaluating dest.z. Allowed error is equivalent to a power function combining the LOG and EXP instructions (EXP(w*LOG(y))). An implementation may support at least 8 fraction bits in the power. It should be noted that since 0.0 times anything may be 0.0, taking any base to the power of 0.0 yields 1.0.
Operation:
  Table 33 sets forth an example of operation associated with the LIT instruction.

TABLE 33

```
t.x = source0.c***;       /* c is x or y or z or w */
t.y = source0.*c**;
t.z = source0.**c*;
t.w = source0.***c;
if (-source0)
    t = -t;
if (t.w < -127.9961)  t.w = -127.9961;  /* assuming power is s8.8 */
else if (t.w > 127.9961)  t.w = 127.9961;
if (t.x < 0.0) t.x = 0.0;
if (t.y < 0.0) t.y = 0.0;
q.x = 1.0;
/* ambient */
q.y = t.x;
/* diffuse */
q.z = (t.x > 0.0 ? EXP(t.w*LOG(t.y)) : 0.0;
/* specular */
q.w = 1.0;
if (destination.x) R.x = q.x;
if (destination.y) R.y = q.y;
if (destination.z) R.z = q.z;
if (destination.w) R.w = q.w;
```

Examples:
  LIT R0,R3
  Appendix A sets forth a plurality of programming examples.

APPENDIX A

```
The #define statements are meant for a cpp run.
1)
; Absolute Value H4 = abs(R0)
    MAX H4,R0,-R0;
2)
; Cross Product | i j k | into R2
;              |R0.x R0.y R0.z|
;              |R1.x R1.y R1.z|
    MUL R2,R0.zxyw,R1.yzxw;
    MAD R2,R0.yzxw,R1.zxyw,-R2;
4)
; reduce R1 to fundamental period
#define PERIOD 70; location PERIOD is 1.0/(2*PI),2*PI,0.0,0.0
    MUL R0,R1,c[PERIOD].x;   //divide by period
    FRC R2,R0;
    MUL R2,R2,c[PERIOD].y;   //multiply by period
5)
; H4 = p->weight.x*H2 + (1.0-p->weight.x)*H3
#define IWGT 8;              source weight
    ADD H4,H2,-H3;           //LERP
    MAD H4,p[IWGT].x,H4,H3;
6)
; R0 = (GT.x || LT.y) ? R1 : R2;
    MOV R0,R2;
    MOV R0(GT.x),R1;
    MOV R0(LT.y),R1;
7)
; R0.y = (EQ.xzw && LT.y) ? R1.z : R2.w;
    MOV R0.y,R1.z;
    MOV R0.y(NE.xzww),R2.w;
    MOV R0.y(GE.y),R2.w;
```

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for programmable pixel processing in a computer graphics pipeline, comprising:

(a) receiving pixel data from a source buffer;
(b) performing programmable operations on the pixel data in order to generate output, wherein the operations are programmable by a user utilizing pixel data-related instructions from a predetermined instruction set; and
(c) storing the output in a register;
(d) wherein the pixel data-related instructions include a no operation instruction, more instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;
(e) wherein the pixel data is swizzled, and the swizzling includes a pixel-related vector component re-mapping.

2. The method as recited in claim 1, wherein the output stored in the register is used in performing the programmable operation on the pixel data.

3. The method as recited in claim 1, wherein the pixel data includes a position, a pixel diffuse color, a specular color, a fog value, and a plurality of texture coordinates.

4. The method as recited in claim 1, wherein the pixel data is selected from the group consisting of a position, a pixel diffuse color, a specular color, a fog value, and a plurality of texture coordinates.

5. The method as recited in claim 1, and further comprising performing an operation involving the output, the operations selected from the group consisting of a scissor operation, a color format conversion, an alpha test operation, a z-buffer/stencil operation, a blend operation, a logic operation, a dither operation, and a writemask operation.

6. The method as recited in claim 1, wherein further standard operations are performed on the pixel data utilizing a standard graphics application program interface (API).

7. The method as recited in claim 1, wherein the output includes a color value and a depth value.

8. The method as recited in claim 1, and further comprising negating the pixel data prior to performing the programmable operations thereon.

9. The method as recited in claim 1, wherein the programmable operations includes a texture fetch operation.

10. The method as recited in claim 9, wherein the texture fetch operation involves a slope.

11. The method as recited in claim 9, wherein the texture fetch operation is capable of being used in a level of detail (LOD) calculation.

12. The method as recited in claim 1, wherein the programmable operations support multiple levels of precision.

13. The method as recited in claim 12, wherein the levels of precision include full floating point, half floating point, and fixed point.

14. The method as recited in claim 12, wherein the programmable operations are capable of converting the pixel data from a first level of precision to a second level of precision.

15. The method as recited in claim 1, wherein the programmable operations are capable of clamping the pixel data for packing the pixel data into a destination.

16. The method as recited in claim 1, wherein condition codes are initialized prior to the programmable operations being performed.

17. The method as recited in claim 1, wherein the programmable operations are capable of removing the pixel data.

18. A computer program product for programmable pixel processing in a computer graphics pipeline, comprising:
(a) computer code for receiving pixel data from a source buffer;
(b) computer code for performing programmable operations on the pixel data in order to generate output, wherein the operations are programmable by a user utilizing pixel data-related instructions from a predetermined instruction set; and
(c) computer code for storing the output in a register;
(d) wherein the pixel data-related instructions include a no operation instruction, more instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;
(e) wherein the pixel data is swizzled, and the swizzling includes a pixel-related vector component re-mapping.

19. A system for programmable pixel processing, comprising:
(a) a source buffer for storing pixel data;
(b) a functional module coupled to the source buffer for performing programmable operations on the pixel data received therefrom in order to generate output, wherein the operations are programmable by a user utilizing pixel data-related instructions from a predetermined instruction set; and
(c) a register coupled to the functional module for storing the output;
(d) wherein the pixel data-related instructions include a no operation instruction, move instruction, multiply instruction, addition instructions, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;
(e) wherein the pixel data is swizzled, and the swizzling includes a pixel-related vector component re-mapping.

20. A method for programmable pixel processing in a computer graphics pipeline, comprising:
(a) receiving pixel data from a source buffer;
(b) performing programmable operations on the pixel data in order to generate output, wherein the operations are programmable by a user utilizing pixel data-related instructions from a predetermined instruction set, and the programmable operations support multiple levels of precision; and (c) converting the pixel data from a first level of precision to a second level of precision;

(d) wherein the pixel data-related instructions include a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number of a first source is less than a second source, set on greater or equal than instruction for setting a destination to a predetermined number if a first source is greater or equal than a second source, and kill pixel instruction;

(e) wherein the pixel data is swizzled, and the swizzling includes a pixel-related vector component re-mapping.

21. A method for programmable pixel processing in a computer graphics pipeline, comprising:

(a) receiving pixel data from a source buffer;

(b) performing programmable operations on the pixel data including a texture fetch in order to generate output, wherein the operations are programmable by a user utilizing pixel data-related instructions from a predetermined instruction set; and (c) storing the output in a register;

(d) wherein the pixel data-related instructions include a no operation instruction, move instruction, multiply instruction, addition instruction, multiply and addition instruction, reciprocal four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;

(e) wherein the pixel data is swizzled, and the swizzling includes a pixel-related vector component re-mapping.

22. A method for programmable pixel processing in a computer graphics pipeline, comprising:

(a) determining whether the graphics pipeline is operating in a programmable mode;

(b) performing programmable operations on pixel data in order to generate output if it is determined that the graphics pipeline is operating in the programmable mode; and (c) performing standard operations on the pixel data in order to generate output in accordance with a standard graphics application program interface if it is determined that the graphics pipeline is not operating in the programmable mode;

(d) wherein pixel data-related instructions are provided includeing a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;

(e) wherein the pixel data is swizzled, and the swizzling includes a pixel-related vector component re-mapping.

23. The method as recited in claim 22, wherein the standard graphics application program interface includes OpenGL®.

24. A computer program product for programmable pixel processing in a computer graphics pipeline, comprising:

(a) computer code for determining whether the graphics pipeline is operating in a programmable mode;

(b) computer code for performing programmable operations on pixel data in order to generate output if it is determined that the graphics pipeline is operating in the programmable mode; and (c) computer code for performing standard operations on the pixel data in order to generate output in accordance with a standard graphics application program interface if it is determined that the graphics pipeline is not operating in the programmable mode;

(d) wherein pixel data-related instructions are provided includeing a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;

(e) wherein the pixel data is swizzled, and the swizzling includes a pixel-related vector component re-mapping.

25. The computer program product as recited in claim 24, wherein the standard graphics application program interface includes OpenGL®.

26. A system for programmable pixel processing in a computer graphics pipeline, comprising:

(a) means for determining whether the graphics pipeline is operating in a programmable mode;

(b) means for performing programmable operations on pixel data in order to generate output if it is determined that the graphics pipeline is operating in the programmable mode; and (c) means for performing standard operations on the pixel data in order to generate output in accordance with a standard graphics application program interface if it is determined that the graphics pipeline is not operating in the programmable mode;

(d) wherein pixel data-related instructions are provided includeing a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;

(e) wherein the pixel data is swizzled, and the swizzling includes a pixel-related vector component re-mapping.

27. The computer program product as recited in claim 26, wherein the standard graphics application program interface includes OpenGL®.

28. A method for programmable pixel processing in a computer graphics pipeline, comprising:
  (a) determining whether the graphics pipeline is operating in a programmable mode;
  (b) performing programmable operations on pixel data in order to generate output if it is determined that the graphics pipeline is operating in the programmable mode; and
  (c) performing standard operations on the pixel data in order to generate output in accordance with a standard graphics application program interface if it is determined that the graphics pipeline is not operating in the programmable mode;
  (d) wherein the programmable operations are pixel data-related and include a no operation, texture fetch, move, derivative, multiply, addition, multiply and addition, reciprocal, reciprocal square root, three component dot product, four component dot product, distance vector, minimum, maximum, pack, unpack, set on less than for setting a destination to a predetermined number if a first source is less than a second source, set on greater or equal than for setting a destination to a predetermined number if a first source is greater or equal than a second source, floor, fraction, kill pixel, exponential base two (2), logarithm base two (2), and light coefficients;
  (e) wherein the pixel data is swizzled, and the swizzling includes a pixel-related vector component re-mapping.

29. A method for programmable processing in a computer graphics pipeline, comprising:
  (a) receiving pixel data including texture information; and
  (b) performing programmable operations on the pixel data in order to generate output, wherein the operations are programmable by a user utilizing pixel data-related instructions from a predetermined instruction set;
  (c) wherein the operations include a mathematical operation for altering the texture information of the pixel data;
  (d) wherein the pixel data-related instructions include a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;
  (e) wherein the pixel data is swizzled, and the swizzling includes a pixel-related vector component re-mapping.

30. A method for programmable processing in a computer graphics pipeline, comprising:
  (a) providing pixel data including texture information; and
  (b) performing programmable operations on the pixel data in order to generate output, wherein the operations are programmable by a user utilizing pixel data-related instructions from a predetermined instruction set;
  (c) wherein the operations include a mathematical operation for altering the texture information of the pixel data;
  (d) wherein the pixel data-related instructions include a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;
  (e) wherein the pixel data is swizzled, and the swizzling includes a pixel-related vector component re-mapping.

31. A method for programmable processing in a computer graphics pipeline, comprising:
  (a) receiving pixel data including color information; and
  (b) performing programmable operations on the pixel data in order to generate output, wherein the operations are programmable by a user utilizing pixel data-related instructions from a predetermined instruction set;
  (c) wherein the operations include a mathematical operation for altering the color information of the pixel data;
  (d) wherein the pixel data-related instructions include a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base two (2) instruction, set on less than instruction for setting a destination to a predetermined number if a first source is less than a second source, set on greater or equal than instruction for setting a destination to a predetermined number if a first source is greater or equal than a second source, and kill pixel instruction;
  (e) wherein the pixel data is swizzled, and the swizzling includes a pixel-related vector component re-mapping.

32. A method for programmable processing in a computer graphics pipeline, comprising:
  (a) receiving pixel data including texture information and color information; and
  (b) performing programmable operations on the pixel data in order to generate output, wherein the operations are programmable by a user utilizing pixel data-related instructions from a single instruction set;
  (c) wherein the pixel data-related instructions include a no operation instruction, move instruction, multiply instruction, addition instruction, multiply and addition instruction, reciprocal instruction, reciprocal square root instruction, three component dot product instruction, four component dot product instruction, minimum instruction, maximum instruction, fraction instruction, exponential base two (2) instruction, logarithm base has (2) instruction, set on less than instruction for setting a destination to a predetermined number if a first source is less than a second source, set on greater or equal than instruction for setting a destination to a predetermined number if a first source is greater or equal than a second source, and kill pixel instruction;

(d) wherein the pixel data is swizzled, and the swizzling includes a pixel-related vector component re-mapping.

\* \* \* \* \*

UNITED STATES PATENT AND TRADEMARK OFFICE
CERTIFICATE OF CORRECTION

PATENT NO. : 6,870,540 B1
APPLICATION NO. : 09/885382
DATED : March 22, 2005
INVENTOR(S) : Lindholm et al.

It is certified that error appears in the above-identified patent and that said Letters Patent is hereby corrected as shown below:

Col. 23, line 8, please replace "more" with --move--;
Col. 23, line 26, please replace "operation" with --operations--;
Col. 23, lines 35-36, please replace "operations" with --operation--;
Col. 24, line 15, please replace "more" with --move--;
Col. 24, line 44, please replace "instructions," with --instruction,--;
Col. 25, line 15, please replace "of" with --if--;
Col. 25, line 34, please replace "reciprocal four" with --reciprocal instruction, reciprocal square root instruction, three component dot product instruction, four--;
Col. 27, line 12, please replace "The computer program product as" with --The system as--;
Col. 29, line 7, please replace "has" with --two--.

Signed and Sealed this
Thirtieth Day of August, 2011

David J. Kappos
*Director of the United States Patent and Trademark Office*